Jan. 22, 1952     L. MASLOW     2,583,514
NESTING MERCHANDISE CART
Filed Feb. 18, 1950     3 Sheets-Sheet 1
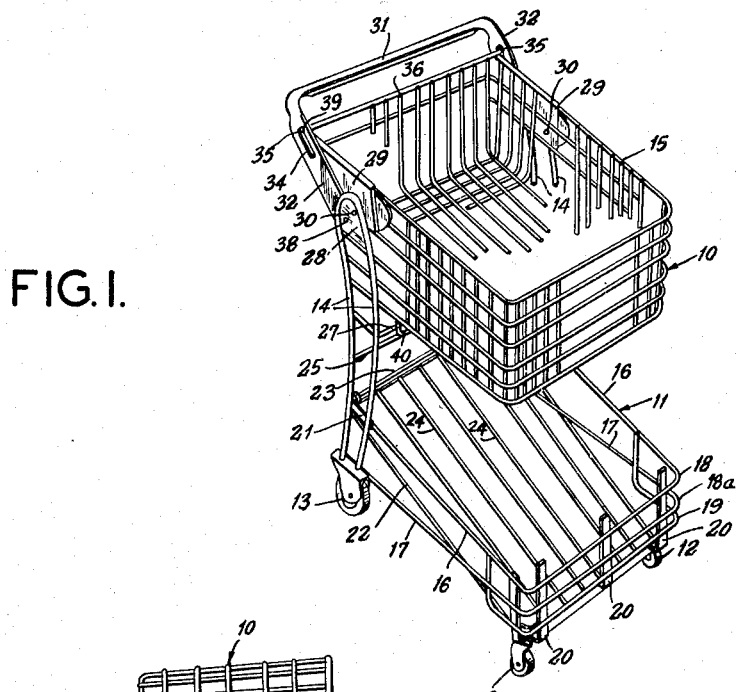
FIG.1.
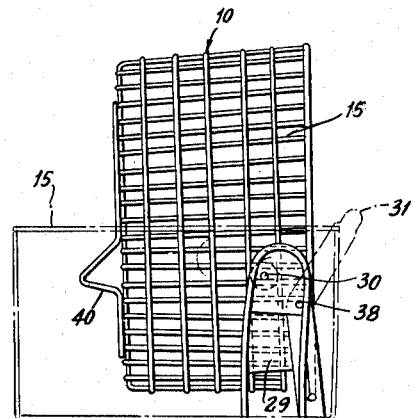
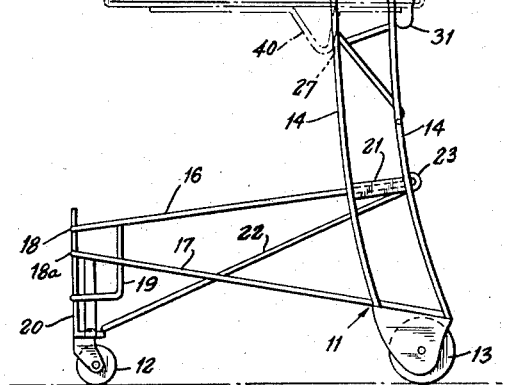
FIG.2.
*INVENTOR.*
LOUIS MASLOW
BY
*Abraham Friedman*
ATTORNEY.

Jan. 22, 1952 L. MASLOW 2,583,514
NESTING MERCHANDISE CART
Filed Feb. 18, 1950 3 Sheets-Sheet 2
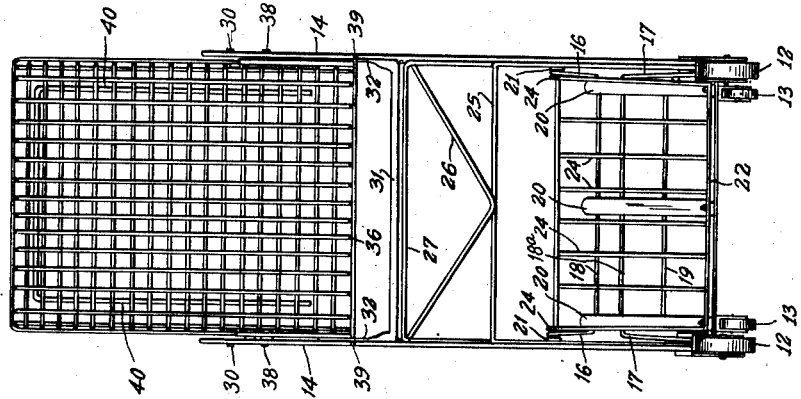
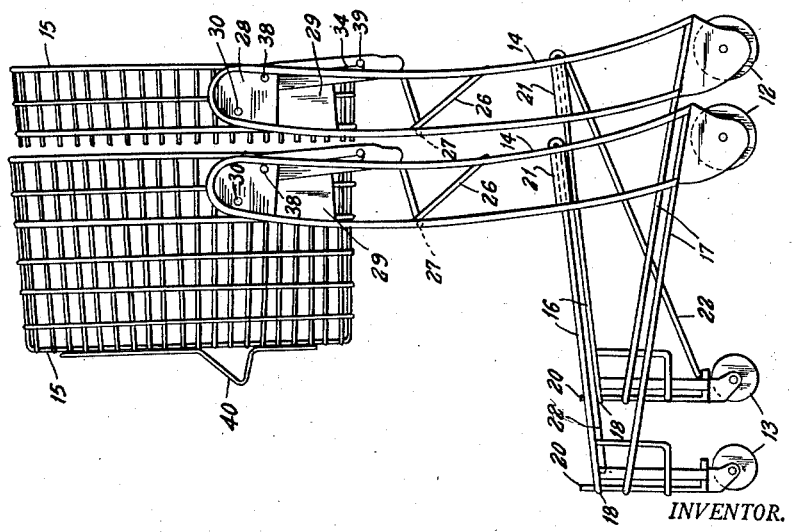
INVENTOR.
LOUIS MASLOW
BY
Abraham Friedman
ATTORNEY.

Jan. 22, 1952 L. MASLOW 2,583,514
NESTING MERCHANDISE CART
Filed Feb. 18, 1950 3 Sheets-Sheet 3
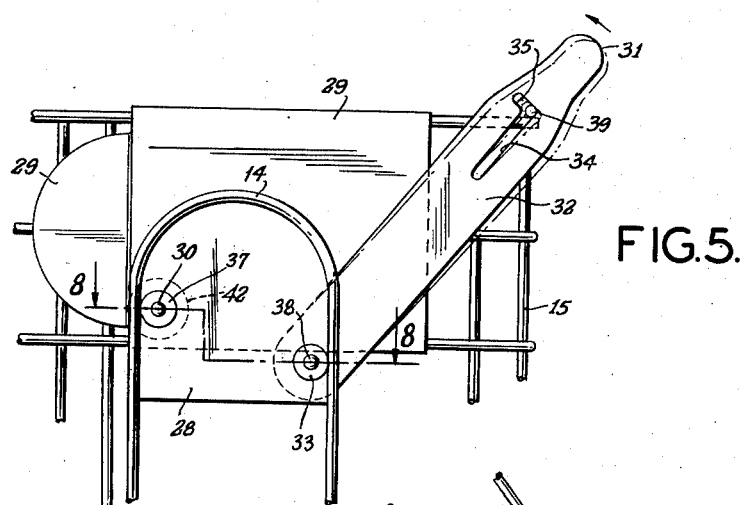
FIG.5.
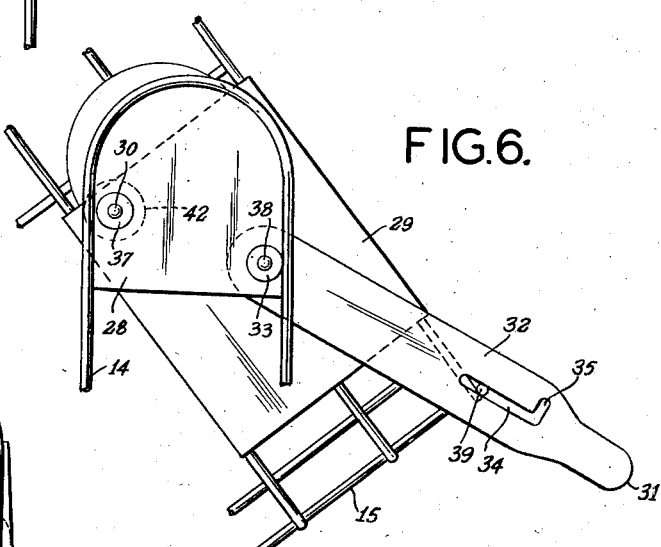
FIG.6.
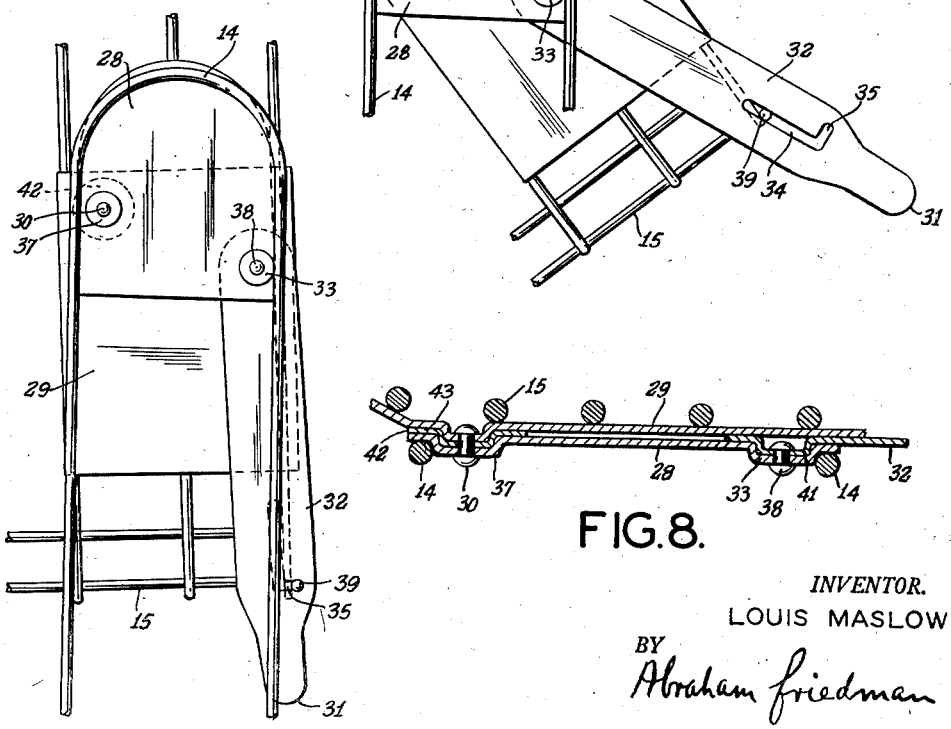
FIG.7.
FIG.8.
INVENTOR.
LOUIS MASLOW
BY
Abraham Friedman
ATTORNEY.

Patented Jan. 22, 1952

2,583,514

UNITED STATES PATENT OFFICE 2,583,514

NESTING MERCHANDISE CART

Louis Maslow, Scarsdale, N. Y.

Application February 18, 1950, Serial No. 144,999

5 Claims. (Cl. 280—47)

This invention relates to a merchandise cart and more particularly to a merchandise cart adapted to be nested with carts of similar construction.

The general type of merchandise cart to which this invention relates may be utilized for the purpose of transporting merchandise or packages from place to place during the process of selection of goods, particularly in the self-service type of store. Such carts have found wide usage and large numbers have been utilized in such stores. Since such carts must be located so as to be immediately available to shoppers, it is desirable that a large number be capable of being stored in a minimum of space.

It is an object of this invention to provide a merchandise cart which is adapted to be nested with carts of similar construction in order to occupy a minimum amount of space and which may be sturdily and efficiently constructed at low cost and which is capable of holding and transporting a considerable quantity of merchandise.

Another object of this invention is to provide a merchandise cart with a merchandise receptacle or basket adapted to be selectively positioned in a horizontal or a vertical plane and to be locked in the selected position in a simple and efficient manner.

Further and more specific objects, features, and advantages will more clearly appear from a consideration of the detailed specification hereinafter set forth especially when taken in connection with the accompanying drawings which illustrate a preferred form which the invention may assume and which form part of the specification.

In the accompanying drawings:

Figure 1 is a perspective view of the improved nesting merchandise cart,

Figure 2 is a side elevation of the cart showing a basket in vertical position and indicating the horizontal position of the basket by broken lines, Figure 3 is a side elevational view of two carts in nested relation, Figure 4 is a rear elevation of the cart, Figures 5, 6 and 7 are enlarged fragmentary views of the pivoting and locking arrangement of the basket, and Figure 8 is a cross-section of the pivoting arrangement taken along line 8—8 of Figure 5.

The merchandise cart comprising the present invention is designated generally by the numeral 10. In the preferred embodiment as herein illustrated the cart is shown to be constructed principally of steel wires or rods welded to each other at appropriate points. It will be understood, however, that other suitable materials and methods of joining may be utilized without departing from this invention.

The general construction of the cart is illustrated in Figure 1 wherein it will be seen that it comprises a rectangular base 11 which forms a lower receptacle. The base 11 is supported by ground engaging wheels or casters 12, 13. Vertical standards 14 extend upwardly from the rear portion of said base 11 at either side thereof and a merchandise receptacle or basket is pivotally supported therebetween. Receptacle or basket 15 is adapted to be selectively positioned so that its opening or mouth lies in a horizontal plane as shown in Figure 1 or in a vertical plane as shown in Figure 2. In its horizontal position the basket is adapted to receive the merchandise or packages to be transported thereby, whereas the vertical position of the basket permits said cart to be nested with carts of similar construction. The basket may be locked in either position. The manner of nesting is more clearly illustrated in Figure 3 wherein it will be seen that each cart base 11 is adapted to receive the base portions of succeeding carts and similarly each basket in vertical position is adapted to receive succeeding baskets in nested relation.

The construction of the cart will now be more particularly described. As shown in Figure 1, the base 11 of the cart is formed of a plurality of wires or rods suitably bent to form a U shape. Upper side members 16 are connected by front cross member 18 and lower side members 17 are similarly connected by front cross member 18a. Additional support for said front and side members is provided by cross member 19. Front cross members 18, 18a and 19 are rigidly secured to each other by means of bars 20 which are formed with right angled bends at their lower ends and also extended above cross member 18 in order to form guides. A pair of forward wheels or casters 12 are mounted at the lower front portion of said base and the housings of the rear wheels are secured to the lower ends of side members 17. The lower ends of vertical standards 14, which may advantageously be formed of a single looped rod as shown, are similarly secured to the housings of said wheels. The ends of upper side members 16 are secured to the interior side of said standards, a strap 21 being interposed between said standards and each of said side members as shown in Figure 4, in order to facilitate nesting of carts as will appear hereafter.

Upper and lower side members 16 and 17 are inclined from the horizontal thereby converging toward each other in a forward direction so that when carts having bases of similar construction are projected into each other, each set of upper and lower side members forming the base of each succeeding cart will nest between each set of upper and lower side members of the carts preceding it, as more clearly appears from Figure 3. In spacing each of side members 16, 17 from the interior surface of the vertical standards 14, the nesting operation is facilitated since a space is thus provided between the side members of each succeeding cart and the interior surface of the vertical standards of the carts preceding it.

An auxiliary receptacle is formed in the base of the cart by means of bottom panel 22. Said bottom panel is formed of a series of substantially parallel wires or rods 24 secured to transverse rods or wires at their ends. Some of wires 24 are extended beyond the rear end of bottom panel 22 and said extensions are looped around transverse brace 23 thereby forming a pivotal mounting for said panel. The bottom panel is inclined, and the forward end thereof rests upon the lower ends of bars 20. Wires 24 are so located as to permit guide bars 20 to be moved along the space between them. Thus, as a succeeding cart is projected into a preceding one, guide bars 20 of the succeeding cart enter the spaces between the wires of the bottom panel of the preceding cart until said preceding bottom panel rests upon front cross member 18 which then lifts said panel up and out of its way, as more clearly appears from Figure 3.

Vertical standards 14 extend upwardly from the sides of base 11, as has heretofore been indicated. Said standards are provided with transverse bracing elements 25, 26, 27. Plates 28 are secured across the upper ends of said standards and are adapted to receive basket 15 therebetween.

The principal package or merchandise receptacle of the cart is basket 15. The basket may be of conventional type and may advantageously be constructed of a gridwork of steel or metal wires suitably formed, the preferred form illustrated being rectangular in horizontal section. The side and end walls of the basket are inclined toward each other in the direction of the bottom wall thereof. Plates 29 are secured to the rear upper portion of each of the side walls of basket 15 so as to be in juxtaposition with plates 28 provided on standards 14. Pivot pins 30, which may be in the form of rivets or bolts, pivotally connect plates 28 to plates 29 on each side of the basket thereby providing pivotal supports therefor, as will more particularly appear hereafter. Stop members 40 are secured to the bottom of the basket and are adapted to rest against brace 27 in order to aid in supporting the basket in horizontal position.

The cart is also provided with a handle bar 31 for the purpose of permitting it to be pushed from place to place. Handle bar 31 is U-shaped and is provided with side arms 32, the ends of which rest between plates 28 and 29. Said side arms are pivotally secured to plates 28 by means of pivot pins 38, as appears more clearly from Figure 8 and will also be more particularly described hereafter. Each of side arms 32 is provided with a guideway or slot 34. Said slots may be considered to be L shaped since their ends terminate in notches 35. The ends of upper marginal wire 36 of the rear end wall of basket 15 are extended so as to project into and form a follower 39 in said slot. As will be more clearly seen from Figures 1 and 5, when the basket is in use in horizontal position, followers 39 rest in notches 35 thereby locking the basket in that position.

The locking and pivoting arrangement may be more clearly seen in Figures 5, 6, 7, and 8 which show a fragment of one side of said cart on an enlarged scale and with respect to which the pivoting and locking action will be more particularly described, it being understood that both sides of the cart are provided with similar arrangements. As shown in Figure 8, plate 28 carried by vertical standard 14 is provided with a perforated cup-shaped indentation or socket 33. A complementary perforated indentation 41 is provided in arm 32 of handle bar 31. A pivot pin, which may be in the form of a rivet 38, is disposed in said perforation thereby pivotally mounting said handle on plate 28. Similarly, socket 37 formed in plate 28 is adapted to receive complementary indentation 43 formed in plate 29 which is secured to the side of the basket. Spacing washer 42 is interposed between said plates to compensate for the thickness of arm 32. A similar pivot pin 30 pivotally secures said standard and basket plates 28 and 29 to each other.

The enlarged fragmentary view of Figures 5, 6 and 7 also illustrate the method whereby the basket is positioned and locked in horizontal or vertical position as desired. Figure 5 illustrates the basket locked in open or horizontal position, the position of the handle arm being shown by broken lines. It will be seen that follower 39 formed by the end of wire 36 extends into the notch portion 35 of slot 34 thus locking the basket in that position. In order to unlock the basket handle 31 is moved in the direction indicated by the arrow thus moving the notch 35 away from the follower 39 and into alignment with the main portion of slot 34 as shown by the solid lines. The basket may then be manually pivoted on pins 30 and passes through the position indicated in Figure 6 wherein follower 39 has reached the limit of its inward motion along slot 34 and reverses its motion with relation thereto. The follower then again approaches notch 35 until the basket reaches vertical position. At this point notch 35 is again in alignment with follower 39 thereby again permitting said follower to enter the notch and lock the basket in vertical position with respect to said cart.

The entire cart may then be nested with carts of similar construction since the tapered or inclined side walls permit succeeding baskets to be projected into each other. The nesting of both baskets and bases is shown in Figure 3 wherein two carts are shown in nested relation. The wires of the succeeding cart have been partly broken away for clarity of illustration, it being understood that said basket extends into the interior of the preceding one.

I have here shown and described a preferred embodiment of my invention. It will be apparent, however, that this invention is not limited to this embodiment, and that many changes, additions and modifications can be made in connection therewith without departing from the spirit and scope of the invention as herein disclosed and hereinafter claimed.

Having described my invention, what I claim as new and desire to secure by Letters Patent is:

1. In a merchandise cart, a base, standards extending upwardly from said base, a receptacle pivotally supported by sand standards, arms pivotally secured to said standards, guideways formed in said arms, followers secured to said receptacle and received in said guideways for the purpose of controlling the movement of said receptacle.

2. A merchandise cart comprising, a base, wheels supporting said base, vertical standards extending upwardly from said base, a merchandise receptacle pivotally supported between the upper ends of said standards, a handle element pivotally secured to said standards and provided with guideways formed therein, projections carried by said receptacle and received as followers within said guideways for the purpose of controlling the pivotal movement of said receptacle.

3. A merchandise cart comprising, a base, wheels supporting said base, vertical standards extending upwardly from said base, a merchandise receptacle pivotally secured between the upper ends of said standards, a U shaped handle element, the side arms of said handle being pivotally secured to said standards, an L shaped guideway formed in each of said side arms, projections secured to said receptacle and received as followers in said guideways for the purpose of controlling the movement of said receptacle.

4. A merchandise cart comprising a base, wheels supporting said base, said base being formed of front and rear members, side members connecting said front and rear members, each of said side members being formed of elements positioned in the same vertical plane, said elements being inclined toward each other in the direction of the front member, vertical standards extending upwardly from said base, a merchandise receptacle pivotally secured between the upper ends of said standards, a U shaped handle element, the side arms of said handle being pivotally secured to said standards, an L shaped guideway formed in each of said side arms, projections secured to said receptacle and received in said guideways for the purpose of controlling the movement of said receptacle.

5. A merchandise cart comprising a base, wheels supporting said base, said base being formed of front and rear members, parallel side members connecting said front and rear members, each of said side members being formed of elements positioned in the same vertical plane, said elements being inclined toward each other in the direction of the front member, vertical standards extending upwardly from said base, a merchandise receptacle pivotally supported between the upper ends of said standards, a handle element pivotally secured to said standards and provided with guideways formed therein, projections carried by said receptacle and received as followers within said guideways for the purpose of controlling the pivotal movement of said receptacle.

LOUIS MASLOW.

REFERENCES CITED

The following references are of record in the file of this patent:

UNITED STATES PATENTS

| Number | Name | Date |
| --- | --- | --- |
| D. 156,701 | Concklin | Jan. 3, 1950 |
| D. 156,702 | Concklin | Jan. 3, 1950 |